June 11, 1968  E. I. VALYI  3,387,324
BLOW MOLDING APPARATUS
Filed April 25, 1966  2 Sheets-Sheet 1
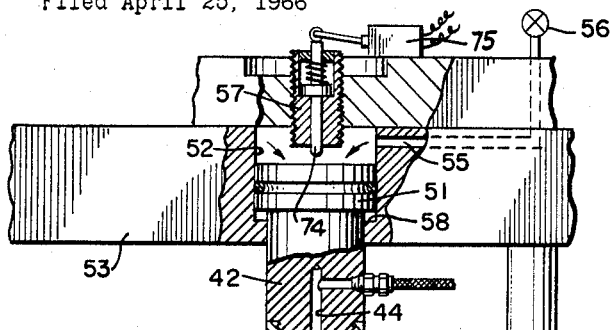
FIG. 1
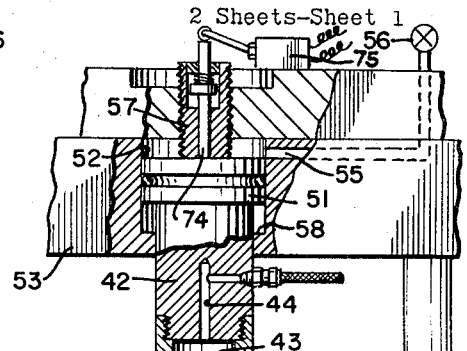
FIG. 2
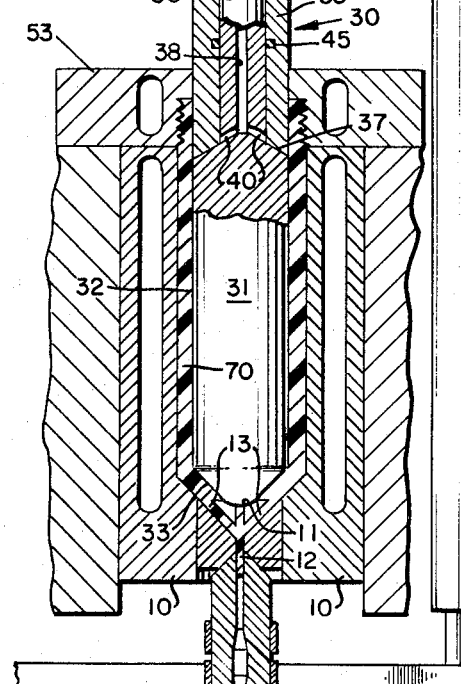
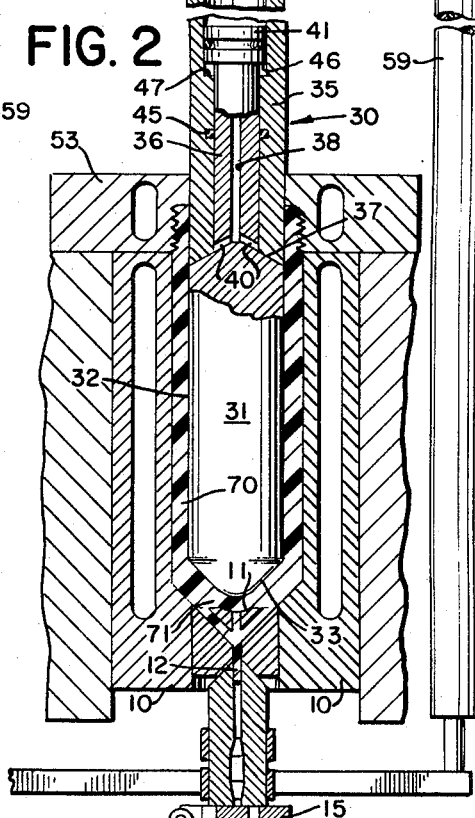
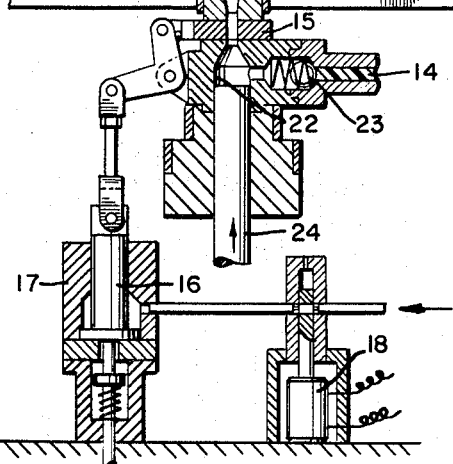
INVENTOR.
EMERY I. VALYI
BY
ATTORNEY June 11, 1968

E. I. VALYI 3,387,324

BLOW MOLDING APPARATUS

Filed April 25, 1966

INVENTOR.
EMERY I. VALYI

BY

ATTORNEY

United States Patent Office 3,387,324
Patented June 11, 1968

3,387,324
BLOW MOLDING APPARATUS
Emery I. Valyi, 5200 Sycamore Ave.,
Riverdale, Bronx, N.Y. 10471
Continuation-in-part of applications Ser. No. 326,410, Nov. 27, 1963, and Ser. No. 353,004, Mar. 8, 1964. This application Apr. 25, 1966, Ser. No. 544,898
8 Claims. (Cl. 18—5)

ABSTRACT OF THE DISCLOSURE

A two-piece blow core on which a parison is molded, with the blow core seated in a parison die, and having blow ports which are closed by a sleeve. The blow core is supported by the sleeve which closes the blow ports when pressure is exerted for seating the blow core in the parison die. When the blow core is inserted in a blow mold, the sleeve is retracted by a pressure cylinder for opening the blow ports.

---

This invention relates to apparatus for blowing hollow articles from a parison and more particularly to apparatus for making a parison of organic plastic material and extending the same in a blow mold.

This application is a continuation-in-part of co-pending applications Ser. No. 326,410, filed Nov. 27, 1963, now abandoned and Ser. No. 353,004, filed Mar. 8, 1964, now abandoned.

An object of the invention is to provide novel and improved apparatus of the above type.

Another object is to provide a blow core having novel and improved characteristics.

Another object is to provide apparatus of the above type having novel and improved features of construction and characteristics of operation.

Various other objects and advantages will be apparent as the nature of the invention is more fully disclosed.

In accordance with the present invention, the parison is molded on a two-piece blow core which is initially seated against the bottom of the parison die for centering the blow core while the side walls of the parison are being injected. After the side walls have been formed, the blow core is retracted by the pressure of the injected plastic material a sufficient distance to provide a clearance for forming at least a part of the bottom of the parison. During this entire injection period, the blow ports in the blow core are held closed by the holding pressure which is exerted on the blow core to oppose the pressure of the plastic material and to hold the core seated. The blow ports are opened only after the blow core with the parison thereon has been introduced into the blow mold and is in position for blowing.

The nature of the invention will be better understood from the following description, taken in connection with the accompanying drawings in which a specific embodiment has been shown for purposes of illustration.

In the drawings:

FIG. 1 is a longitudinal section with parts in elevation of a parison die showing the blow core seated against the bottom of the outer die member and the plastic injected to form the side walls of the parison;

FIG. 2 is a similar view showing the blow core retracted to form the bottom wall of the parison.

Figure 3:
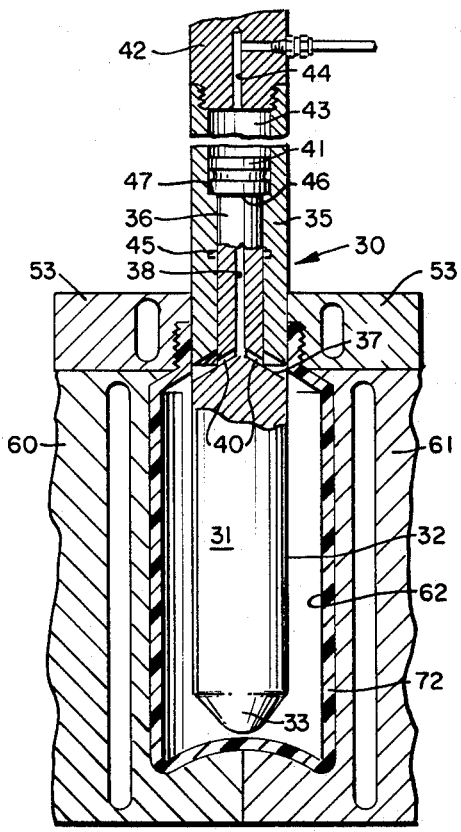
FIG. 3 is a similar view showing the blow core in blow position within the blow mold and the hollow article in the blow mold cavity.
Figure 3:
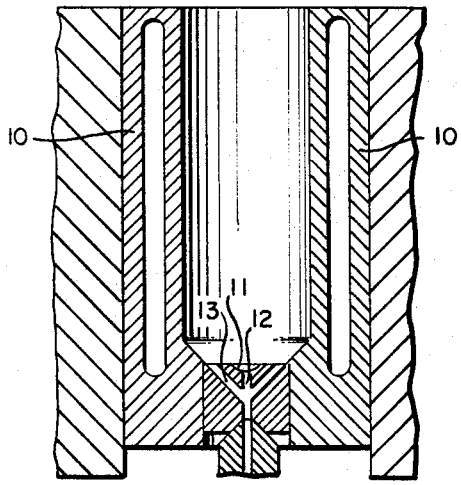

Referring to the drawings more in detail, the invention is shown as embodied in a blow molding apparatus comprising an outer parison die member having split side walls 10 and a bottom wall 11 shaped to conform to the outer surfaces of the parison walls to be formed therein. The bottom wall 11 includes a sprue having a central passage 12 for the hot flowable plastic and communicating with a series of radially extending passages 13 terminating in a ring of injection openings disposed to inject the plastic into the side walls of the parison.

The central passage 12 communicates with an injection chamber 22 through a slide valve 15 actuated by a piston 16 working in a fluid cylinder 17 the fluid pressure to which is controlled by a solenoid valve 18 which is adapted to open and close the valve 15 in response to a feeler contact to be actuated by rectraction of the blow core.

The plastic material is supplied to the chamber 22 through passage 14 having a check valve 23. Pressure is exerted in chamber 22 by a ram 24 causing the plastic material to flow through passage 12 while valve 15 is open and check valve 23 is closed.

The blow core 30 comprises a lower portion 31 having side walls 32 and a bottom wall 33 adapted to define the inner surfaces of the corresponding parts of the parison walls. The bottom wall 33 is adapted to seat against the bottom wall 11 of the outer parison die member for centering the blow core in the parison die while the side walls of the parison are being injected.

The outer blow core part comprises a slidable member 35 having an outside diameter which is the same as or larger than that of the blow core walls 32. The slidable member 35 is disposed to slide over a stem 36 of the blow core and to engage a shoulder 37 on the blow core to form a continuous outer surface around which the parison is formed. The blow core stem 36 is provided with an axial passage 38 for blow air terminating in radial ports 40 adjacent the shoulder 37. The slidable member 35 is shown in the form of a sleeve which extends past the end 41 of the stem 36 and has a closure member 42 forming a fluid cylinder 43 into which fluid under pressure may be supplied through an inlet passage 44 and in which the end 41 of the stem 36 slides. The arrangement is such that fluid pressure in the cylinder 43 causes relative movement of the slidable member 35 and the blow core part 31 for opening the blow air ports 40 and thereafter the fluid pressure is supplied through the blow air ports from the cylinder 43 through the passage 38 and the ports 40 for blowing the parison.

An O-ring 45 carried by the slidable member 35 engages the stem 36 of the blow core part 31 to exert friction for preventing relative movement of the slidable member and core when the slidable member and stem are being retracted from the parison die. Alternatively, a tension spring may be introduced into the cylinder 43 to hold the slidable member in engagement with the shoulder 37 in absence of fluid pressure in the cylinder 43. The end 41 of the stem 36 may be formed with a shoulder 46 engaging a shoulder 47 on the slidable member to form a stop to limit the sliding movement of the stem 36 in the slidable member 35 when the cylinder 43 is pressurized.

The closure member 42 carries a head 51 forming a piston sliding in a cylinder 52 formed in a cross-head 53. Hyraulic pressure is supplied to the cylinder 52 through a passage 55 which may be closed by a valve 56. An adjustable stop 57 limits the retraction of the head 51 of the rod 50 into the cylinder 52 and a shoulder 58 limits the extension of the head 51 so that the entire blow core is retracted with the cross-head 53 when the latter is raised. The cross-head 53 is actuated by a hydraulic cylinder 59 for shifting the blow core between injection and blowing positions.

The blow mold is shown in FIG. 3 as formed in two parts 60 and 61 having a cavity 62 therein shaped to form the hollow article. A neck ring 53 is disposed to form the neck of the parison and to hold the neck in position during the blowing of the hollow article.

In the operation of this apparatus, the cross-head 53 is advanced to seat the bottom wall 33 of the blow core against the bottom wall 11 of the outer die member as shown in FIG. 1. The cross-head cylinder 52 is filled with hydraulic fluid through the passage 55 under a pressure to advance the head 51 to seat the blow core 31 on the bottom wall 11 of the parison die, and the valve 56 is then closed to maintain the head in this position. The cross-head 53 and slidable member 35 then move as a unit and carry the blow core part 31 which has been extended by air pressure in the cylinder 43 during the previous blowing operation so that the blow ports 40 are open.

When the bottom wall 33 of the blow core seats against the bottom wall 11 of the lower die member, continued advance of the cross-head 53 causes the slidable member 35 to advance with respect to the blow core part 31 until it engages the shoulder 37 to close the blow ports 40 and to form a continuous surface for the parison wall cavity. The valve 15 is then opened and hot flowable plastic material is injected to form side walls 70 of the parison as shown in FIG. 1.

At a selected time during the injection of the side walls, the valve 56 is opened to release the hydraulic pressure in the cross-head cylinder 52. When the pressure of the plastic on the bottom wall 33 of the blow core becomes sufficiently high to overcome the hydraulic pressure in the cross-head cylinder, the blow core 30 is retracted against the stop 57 which is set to provide clearance between the bottom of the blow core and the bottom of the outer die member for forming at least a portion of the bottom wall of the parison. The bottom wall 71 is then injected as shown in FIG. 2 to complete the parison. During this entire time the slidable member 35 is held against the shoulder 37 by the pressure of the plastic against the bottom wall 33 so that the blow ports 40 remain closed.

After the parison has set to the proper point, the outer die members 10 are opened slightly to free the outer surface of the parison walls 70 and the blow core, with the parison thereon, is retracted from the injection position into blow position by suitable actuation of the cross-head 53.

When in blow position, the blow mold parts 60 and 61 are closed around the parison and air pressure is supplied to the cylinder 43 to cause relative movement of the slidable member 35 and blow core part 31 to open the blow ports 40 and to supply air through the blow ports to expand the parison into the blow mold cavity 62 as shown in FIG. 3 and thus form the hollow article 72.

After the article has been blown, the blow core is retracted by further movement of the cross-head 53, the blow mold opened and the finished article removed. The blow core is then returned into the injection die and the cycle repeated.

In this apparatus it is to be noted that the blow ports in the blow core are automatically opened and closed by the movement of the cross-head which transfers the blow core between injection and blow positions and by the blow air which is supplied at the blow position. Also the blow core is centered by the seating of the bottom wall of the blow core and then retracted by the pressure of the plastic after the side walls have been formed.

When the head 51 has been retracted in the cylinder 52 against the stop 57, it engages a plunger 74 which in turn actuates a switch 75 which is connected to energize the solenoid 18 so as to close the valve 15 and interrupt the injection of the plastic before the parison die is opened. Alternatively, a pressure actuated switch may be connected to be closed in response to the pressure of the plastic material which would become greater when the parison cavity is filled. In either case, the pressure of the plastic in the injection passage is released before the parison die is opened.

What is claimed is:

1. Apparatus for making hollow articles of flowable organic plastic material comprising a parison die having an outer die member and a blow core having side and end walls spaced to form an injection cavity in which the parison is to be formed, said blow core having a blow port and having a slidable member adapted to close said port, said slidable member having an outer surface forming a part of the blow core side wall, means connected to said slidable member to advance and retract said blow core, said slidable member when advanced closing said port and holding the blow core seated against the bottom wall of said outer die member, means responsive to the pressure of the injected plastic on the bottom wall of said blow core to retract said blow core for the formation of at least a part of the bottom wall of the parison, means transferring the blow core with the parison thereon from said outer die member to a blow station, and means shifting said slidable member and said blow core relative to each other for opening said blow port.

2. Apparatus as set forth in claim 1, in which said slidable members forms a fluid cylinder and said blow core carries a head sliding in said cylinder and adapted to effect relative movement between said slidable member and said blow core in response to fluid pressure in said cylinder.

3. Apparatus as set forth in claim 2 in which stop means is provided to limit the retraction of said slidable member.

4. Apparatus as set forth in claim 2 in which said head carries means opposing relative movement between the blow core parts in the absence of actuating pressure on said head.

5. Apparatus as set forth in claim 1 in which said blow core comprises a part having a shoulder against which said slidable member seats for closing said port and said slidable member and blow core part have a substantially continuous outer surface defining the inner wall of the parison cavity.

6. Apparatus as set forth in claim 1 in which a cross-head is connected to said slidable member for transferring the blow core from injection to blow positions and fluid pressure means is provided to permit limited movement of said slidable member with respect to said cross-head in response to the pressure of the injected plastic adapted to provide clearance for the injection of at least part of the bottom wall of said parison.

7. Apparatus as set forth in claim 6 in which said last means comprises a cylinder connected to be actuated with said cross-head and said slidable member is connected to a piston sliding in said cylinder.

8. Apparatus as set forth in claim 7 in which means is provided to interrupt the injection of the plastic when said last piston and the blow core carried thereby has reached the limit of its movement to provide clearance for the formation of at least part of the bottom wall of the parison.

References Cited

UNITED STATES PATENTS

| | | | |
|---|---|---|---|
| 2,262,612 | 11/1941 | Kopitke | 18—5 X |
| 2,822,578 | 2/1958 | Lobell | 264—328 |
| 2,974,362 | 3/1961 | Knowles | 18—5 |
| 3,264,684 | 8/1966 | Moslo | 18—5 |

WILBUR L. McBAY, *Primary Examiner.*